United States Patent [19]
Mathys

[11] 3,805,302
[45] Apr. 23, 1974

[54] FINGER JOINT PROTHESIS

[76] Inventor: Robert Mathys, Guterstrasse 5, 2544 Bettlach, Switzerland

[22] Filed: Oct. 5, 1972

[21] Appl. No.: 295,263

[30] Foreign Application Priority Data
Oct. 8, 1971 Switzerland............... 14688/71

[52] U.S. Cl............ 3/1, 128/92 C, 46/173, 287/85 R, 287/100
[51] Int. Cl. ............................................ A61f 1/24
[58] Field of Search .......................... 3/1, 12–12.8; 128/92 C, 92 R; 46/161, 173; 287/100, 97, 85 R

[56] References Cited
UNITED STATES PATENTS
| 56,749 | 7/1866 | Hilburn................... 287/100 |
| 2,649,806 | 8/1953 | Monaghan............... 46/173 |
| 3,506,982 | 4/1970 | Steffee..................... 3/1 |
| 3,688,316 | 9/1972 | Lagrange et al.......... 3/1 |
| 2,490,364 | 12/1949 | Livingston............... 128/92 BA |

FOREIGN PATENTS OR APPLICATIONS
540,713 3/1956 Italy.................. 32/10 A

Primary Examiner—Richard A. Gaudet
Assistant Examiner—Ronald L. Frinks
Attorney, Agent, or Firm—Werner W. Kleeman

[57] ABSTRACT

A surgically implantable finger joint prothesis designed as a bifurcated or forked joint, wherein both fork legs of a fork of one joint component possess a respective opening widening towards the inside and the second joint component rotatably mounted at the fork is provided with two conical journals or pivot pins fitting into the openings. The fork legs are formed of such an elastic material, typically plastic, that in the presence of an overload they deviate axially and enable the journals to depart from the openings.

4 Claims, 2 Drawing Figures

FINGER JOINT PROTHESIS

BACKGROUND OF THE INVENTION

The present invention relates to a new and improved construction of a surgically implantable finger joint prothesis to be attached to respective bone ends of a finger joint.

The presently known finger joint prothesis generally consists of two similar components which collectively form a simple axle joint and are held together by a screw. In a number of constructions, the screw serves as a retaining screw which can be threaded into a joint bolt present at a joint or hinge component and by means of its head rotatably retains, yet so as not to be axially displaceable, the second joint or hinge component which is constructed as an eyelet. Other joint arrangements employ the screw bolts themselves as pivot pins.

The drawback of such known joint protheses, which conventionally consist of metal, resides in the fact that in contrast to a natural joint, in the presence of great loads they can cause bone fracture or fissure.

SUMMARY OF THE INVENTION

Hence, from what has been discussed above, it should be apparent that this particular field of technology is still in need of a finger joint prothesis which is not associated with the aforementioned drawbacks and limitations of the prior art proposals. It is therefore a primary object of the present invention to provide a new and improved construction of finger joint prothesis which avoids the aforementioned drawbacks existent in the state-of-the-art constructions and effectively and reliably fulfills the need still present in this particular art.

Another and more specific object of the present invention relates to a new and improved construction of finger joint prothesis which is relatively simple in construction and design, economical to manufacture, and quite safe to use.

Now in order to implement these and still further objects of the invention, which will become more readily apparent as the description proceeds, the finger joint prothesis of this invention is generally manifested by the features that it is constructed as a bifurcated or forked joint wherein both fork legs of one joint component each possess a respective opening widening towards the inside and the second joint component which is freely rotatably mounted at the bifurcated portion of the one joint component is provided with two conical knuckle journals or pivot pins which fit into the openings. The legs of the bifurcated portion are formed of such type elastic material that when they are subjected to overload they axially deviate and permit the journals to depart from the openings. It is advantageous if at least both fork legs are formed of plastic; it is of course readily possible to form both joint or hinge components completely from plastic and to employ at most for spreading the anchoring part a metallic cone.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
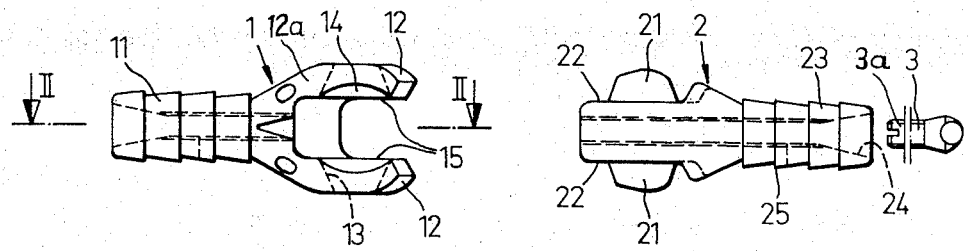
FIG. 1 is a bottom view of both adjacently arranged joint or hinge components.
Figure 2:
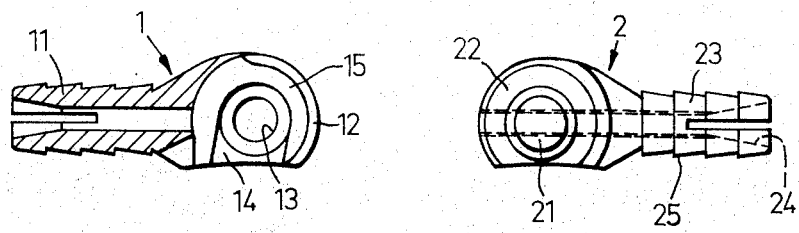
FIG. 2 depicts at the left-half thereof a sectional view taken substantially along the line II—II of FIG. 1, and at the right-half of FIG. 2 there is shown a side view of the corresponding component of FIG. 1.

Describing now the drawing, the exemplary embodiment of finger joint prothesis illustrated therein will be understood to embody a joint or hinge component designated in its entirety by reference character 1. The joint component 1 possesses a forked strut or handle 11 constructed as a hollow plug or mandrel and a fork portion 12a embodying two fork legs 12, each of which is constructed as an eyelet and provided with an inwardly widening conical opening 13, as shown. The angle of opening of each such two openings respectively amounts to about 40°. A groove 14 leads to each such opening 13, this groove 14 rendering possible both the insertion as well as also removal or jumping-out of the knuckle journals or pins 21 of a second joint or hinge component 2. These journals or pins 21 are likewise of conical design, and specifically constructed such that they fit, without being fixedly seated, into the associated opening 13 of the first joint component 1. In the assembled together condition both of the flat, circular ring-shaped surfaces 22, of which a respective one surrounds each knuckle journal or pin 21, bear against the associated inner surface 15 of the bifurcated or fork legs 12.

Also the second joint or hinge component 2 possesses a hollow plug or mandrel which has been designated by reference character 23. Also in this case a bore 24 extends through the entire joint component 23, so that an expanding pin 3 inserted from the outside, following insertion of the plug or mandrel 23 into a prepared bore of a finger bone, can be threaded from the side of the joint by means of a suitable turning tool, such as a screw driver into the hollow plug or mandrel 23 and thus such can be expanded, whereby its sawtooth-shaped ribs 25 snugly come to bear in the bore of the bone. For this purpose the threadable expanding pin 3 can be provided at its end confronting the joint axis with suitable means, such as slot 3a, for rendering possible application of the turning tool.

When both of the joint components 1 and 2 are secured in this manner in a respective finger bone, it is possible to insert the joint component 2 into the fork 12a of the joint component 1. To this end it is merely necessary to displace both pivot pins or journals 21 over the grooves 14 to the openings 13, while elastically expanding the fork legs 12. As soon as such pivot pins 21 enter the openings 13, the fork portion or fork 12a again assumes its original shape and the joint is assembled together. In this regard the elasticity of the fork legs is to be chosen such that in the presence of an overload such legs again free or release the joint component 2. This can be readily realized in that both components 1 and 2 can be fabricated of a conventional plastic of appropriate elasticity, such as for instance a copolymer of polymethylene oxide, commercially available from the well known German firm Farbwerke Hoechst AG of Frankfurt, Germany, under their trademark "HOSTAFORM."

While there is shown and described present preferred embodiments of the invention, it is to be distinctly understood that the invention is not limited thereto, but may be otherwise variously embodied and practiced within the scope of the following claims.

What is claimed is:

1. A surgically implantable finger joint prothesis comprising a bifurcated joint arrangement embodying a pair of joint components, each joint component having means at one end thereof for attachment to respective bone ends of a finger joint, one joint component having a pair of fork legs, both fork legs of said one joint component being provided with a respective inwardly widening opening, means for rotatably mounting the other joint component at the one joint component, said other joint component having two conical journals fitting into said openings and defining said rotatably mounting means, said fork legs being formed of such elastic material that in the presence of an overload they tend to deviate and permit the journals to depart from the openings.

2. The finger joint prothesis as defined in claim 1, wherein at least both fork legs are formed of plastic.

3. The finger joint prothesis as defined in claim 1, wherein both fork legs are provided at their inner surfaces with a respective groove extending to the associated opening, said groove facilitating the introduction of the journals into the openings and during overload allowing jumping out of the journals from such openings.

4. The finger joint prothesis as defined in claim 1, wherein each joint component bone attachment means comprises a hollow plug equipped with a threadable expanding pin and intended to be inserted and fixed at a bore of a corresponding finger bone, said expanding pin possessing, at its end confronting the joint axis, means rendering possible application of a turning tool.

* * * * *